United States Patent [19]

Hanyu et al.

[11] Patent Number: 5,316,805
[45] Date of Patent: May 31, 1994

[54] LIQUID CRYSTAL DEVICE

[75] Inventors: Yukio Hanyu, Atsugi; Masanobu Asaoka, Yokohama, both of Japan

[73] Assignee: Canon Kabushiki Kaisha, Tokyo, Japan

[21] Appl. No.: 981,432

[22] Filed: Nov. 25, 1992

Related U.S. Application Data

[62] Division of Ser. No. 529,509, May 29, 1990, Pat. No. 5,192,596.

[30] Foreign Application Priority Data

| Jun. 2, 1989 | [JP] | Japan | 1-141395 |
| Jun. 2, 1989 | [JP] | Japan | 1-141396 |
| Jun. 22, 1989 | [JP] | Japan | 1-160278 |
| Apr. 24, 1990 | [JP] | Japan | 2-109658 |

[51] Int. Cl.$^5$ ............................................. G02F 1/1337
[52] U.S. Cl. .................................... 428/1; 359/75; 359/76; 359/78; 428/473.5
[58] Field of Search .................. 428/1, 473.5; 359/75, 359/77, 78, 76

[56] References Cited

U.S. PATENT DOCUMENTS

| 4,367,924 | 1/1983 | Clark et al. | 350/334 |
| 4,561,726 | 12/1985 | Goodby et al. | 350/341 |
| 4,735,492 | 4/1988 | Sekine et al. | 350/341 |
| 4,820,026 | 4/1989 | Okada et al. | 350/341 |
| 4,883,344 | 11/1989 | Okada et al. | 350/339 |
| 4,932,757 | 6/1990 | Hanyu et al. | 350/339 |

FOREIGN PATENT DOCUMENTS

| 0231781 | 8/1987 | European Pat. Off. . |
| 107216 | 8/1981 | Japan . |
| 2174399 | 11/1986 | United Kingdom . |

*Primary Examiner*—Alexander S. Thomas
*Attorney, Agent, or Firm*—Fitzpatrick, Cella, Harper & Scinto

[57] ABSTRACT

A liquid crystal device is formed by applying an alignment film comprising a fluorine-containing polyimide having a fluorine-containing substituent in its moiety originated from a diamine on at least one of a pair of substrates sandwiching a chiral smectic liquid crystal. Preferably, the respective substrates are provided with such florine-containing polyimide alignment films which have been rubbed in directions which are substantially parallel with each other and identical to each other or which intersect each other at a small counterclockwise intersection angle. The liquid crystal device thus formed shows a high contrast display, particularly by multiplexing drive, free from after-image because of quick responsiveness.

3 Claims, 6 Drawing Sheets

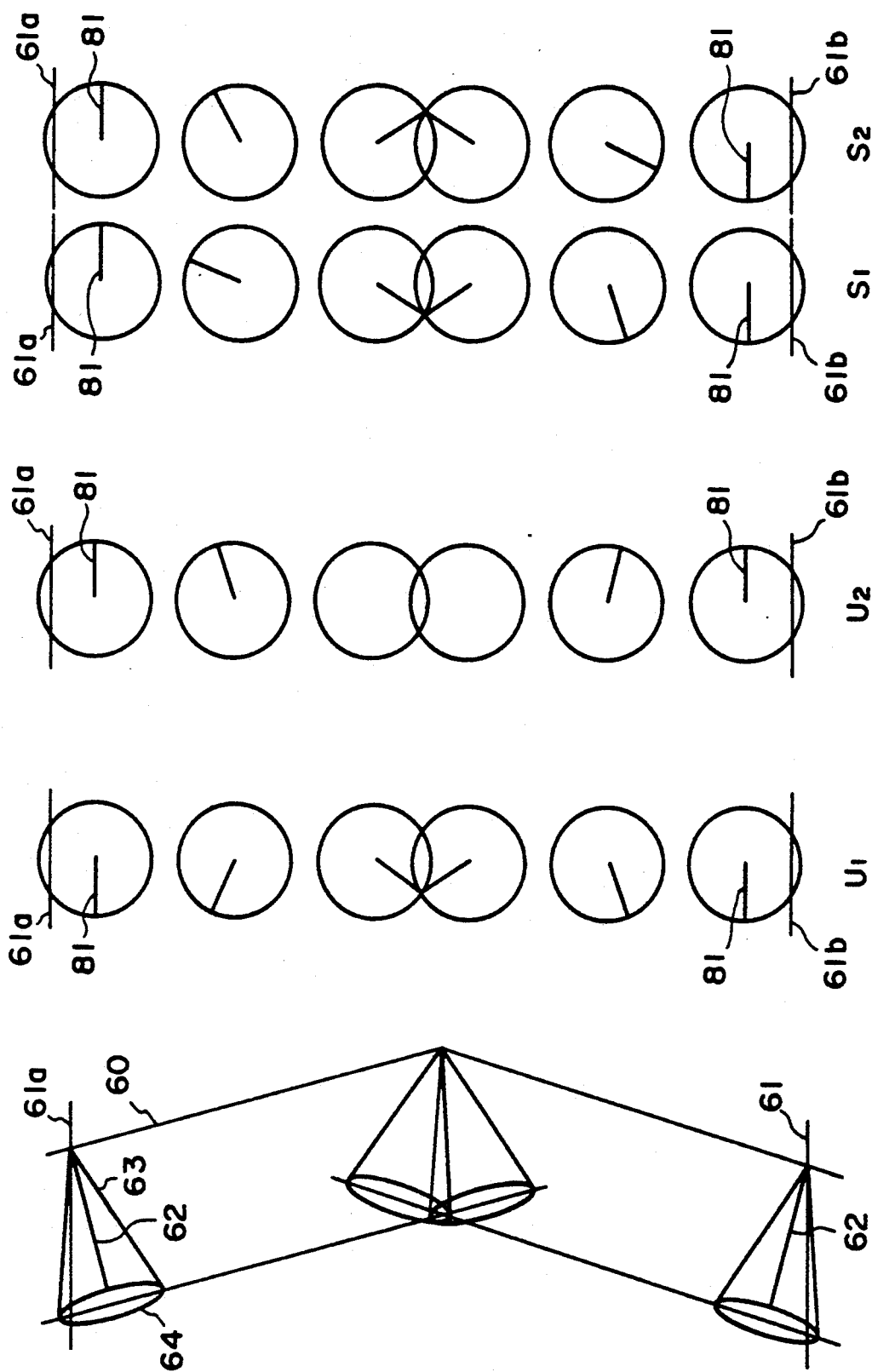

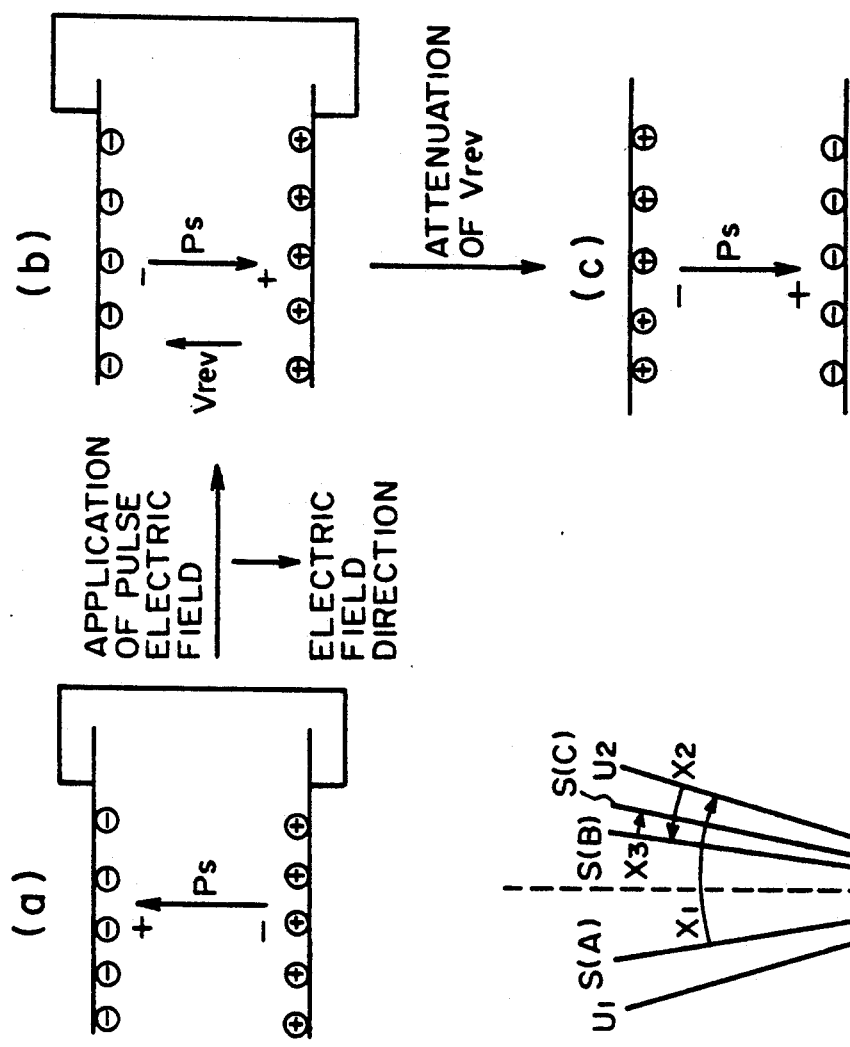
FIG. 6
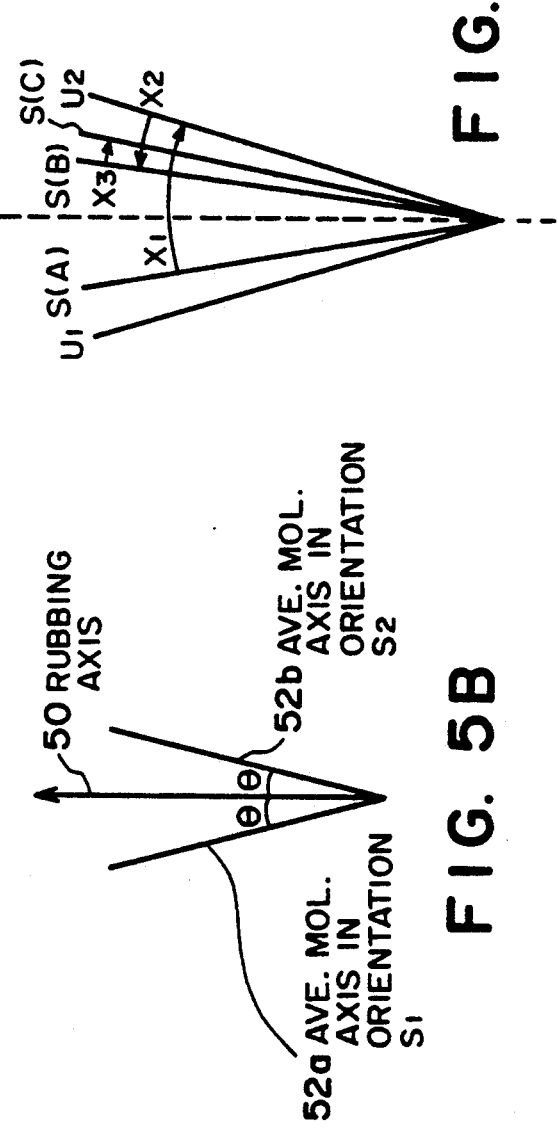
FIG. 7
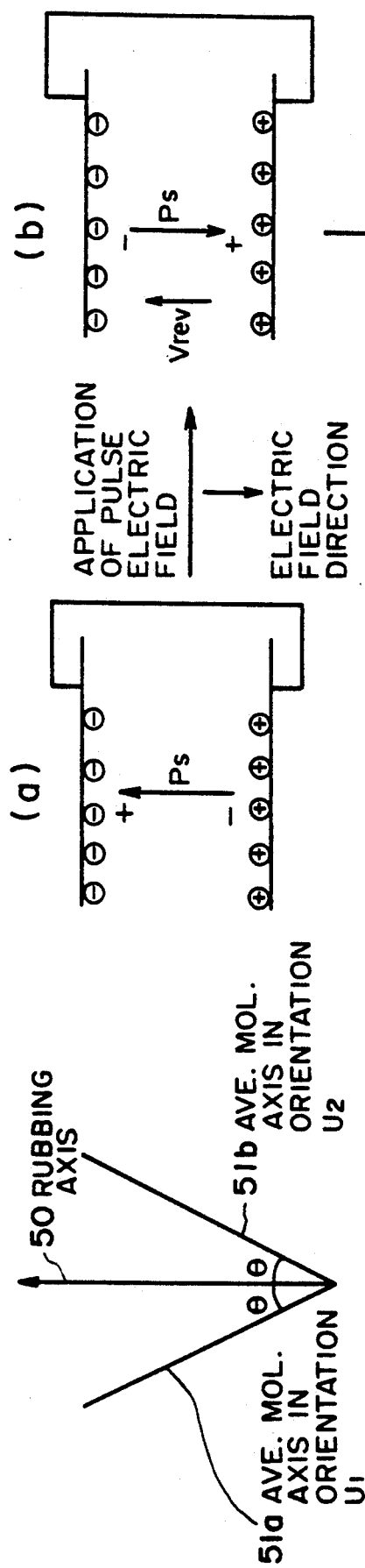
FIG. 5A
FIG. 5B

LIQUID CRYSTAL DEVICE

This application is a division of application Ser. No. 07/529,509 filed May 29, 1990 now U.S. Pat. No. 5,792,596.

FIELD OF THE INVENTION

This invention relates to a liquid crystal device to be used in a liquid crystal display device or a liquid crystal-optical shutter, etc., particularly a liquid crystal device by use of a ferroelectric liquid crystal, more particularly to a liquid crystal device improved in display characteristics thruogh improvement in initial alignment of the liquid crystal molecules.

A display device of the type which controls transmission of light in combination with a polarizing device by utilizing the refractive index anisotropy of ferroelectric liquid crystal molecules has been proposed by Clark and Lagerwall (Japanese Laid-Open Patent Application No. 107216/1 U.S. Pat. No. 4,367,924). The ferroelectric liquid crystal has generally chiral smectic C phase (SmC*) of H phase (SmH*) of a non-helical structure and, under this state, shows a property of taking either one of a first optically stable state and a second optically stable state responding to an electrical field applied thereto and maintaining such a state in the absence of an electrical field, namely bistability, and also has a rapid response to the change in electrical field. Thus, it is expected to be utilized in a high speed and memory type display device and particularly to provide a large-area, high-resolution display.

For an optical modulating device by use of a liquid crystal having such bistability to exhibit desirable driving characteristics, it is required that the liquid crystal disposed between a pair of substrates should be in such a molecular alignment state that conversion between the above two stable states may occur effectively irrespective of the application of an electrical field.

Further, in a liquid crystal device utilizing birefringence of a liquid crystal, the transmittance under right angle cross nicols is given by the following equation:

$$I/I_0 = \sin^2 4\theta \cdot \sin^2(\Delta nd/\lambda)\pi,$$

wherein $I_0$: incident light intensity,
$I$: transmitted light intensity,
$\theta$: tilt angle,
$\Delta n$: refractive index anisotropy,
$d$: thickness of the liquid crystal layer,
$\lambda$: wavelength of the incident light.

The tilt angle $\theta$ in the above-mentioned non-helical structure is recognized as a half of an angle between the average molecular axis directions of liquid crystal molecules in a twisted alignment in a first orientation state and a second orientation state. According to the above equation, it is shown that a tilt angle $\theta$ of 22.5 degrees provides a maximum transmittance and the tilt angle in a non-helical structure for realizing bistability should desirably be as close as possible to 22.5 degrees.

A method for aligning a ferroelectric liquid crystal should desirably be such that molecular layers each composed of a plurality of molecules of a smectic liquid crystal are aligned uniaxially along their normals, and it is desirable to accomplish such an alignment state by a rubbing treatment which requires only a simple production step.

As an alignment method for a ferroelectric liquid crystal, particularly a chiral smectic liquid crystal in a non-helical structure, one disclosed in U.S. Pat. No. 4,561,726 has been known for example.

However, when a conventional alignment method, particularly one using a polyimide film treated by rubbing, is applied for alignment of a ferroelectric liquid crystal in a non-helical structure exhibiting bistability reported by Clark and Lagerwall, the following problems are encountered.

That is, according to our experiments, it has been found that a tile angle $\theta$ (an angle shown in FIG. 3 as described below) in a ferroelectric liquid crystal with a non-helical structure obtained by alignment with an alignment control film of the prior art has become smaller as compared with a tilt angle ⓗ (the angle ⓗ is a half of the apex angle of the cone shown in FIG. 2 as described below) in the ferroelectric liquid crystal having a helical structure. Particularly, the tilt angle $\theta$ in a ferroelectric liquid crystal with a non-helical structure obtained by alignment with alignment control films of the prior art was found to be generally on the order of 3–8 degrees, and the transmittance at that time was at most about 3 to 5%.

Thus, according to Clark and Lagerwall, the tilt angle in a ferroelectric liquid crystal with a non-helical structure realizing bistability should have the same angle as the tilt angle in the ferroelectric liquid crystal having a helical structure, but in fact the tilt angle $\theta$ in a non-helical structure is smaller than the tilt angle ⓗ in a helical structure. More specifically, it has been found that the tilt angle $\theta$ in a non-helical structure becomes smaller than the tilt angle ⓗ because of a twist alignment of liquid crystal molecules in the non-helical structure. Thus, in a ferroelectric liquid crystal having a non-helical structure, liquid crystal molecules are aligned with a twist from a molecular axis adjacent to an upper substrate to a molecular axis adjacent to a lower substrate continuously at a certain twist angle. This leads to a phenomenon that the tilt angle $\theta$ in the non-helical structure is smaller than the tilt angle ⓗ in the helical structure.

Further, in an alignment state of a chiral smectic liquid crystal attained by a conventional polyimide alignment film subjected to a rubbing treatment, when a liquid crystal is supplied with a voltage of one polarity for switching from a first optically stable state (e.g., a white display state) to a second optically stable state (e.g., a black display state) and then the voltage of one polarity is removed, the ferroelectric liquid crystal layer is supplied with a reverse electric field Vrev due to the presence of the polyimide film as an insulating layer between the electrode and the liquid crystal layer, and the reverse electric field Vrev has caused an afterimage during display. The generation of the above-mentioned reverse electric field has been reported in "Switching characteristic of SSFLC" by Akio Yoshida, "Preprint for Liquid Crystal Forum, October 1987" p.p. 142–143.

SUMMARY OF THE INVENTION

Accordingly, an object of the present invention is to provide a ferroelectric liquid crystal device having solved the above-mentioned problems, particularly a ferroelectric liquid crystal device which provides a large tilt angle of a chiral smectic liquid crystal in a non-helical structure and provides a display capable of displaying a high-contrast image and yet free from after-image.

According to a principal aspect of the present invention, there is provided a liquid crystal device, comprising: a pair of substrates and a chiral smectic liquid crystal disposed between the substrates; at least one of said pair of substrates having thereon an alignment film comprising a polyimide which has a fluorine-containing substituent in its diamine-originated moiety.

The above-mentioned diamine originated moiety may preferably be one represented by the following structural formula (I) or (II).

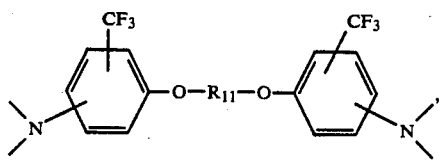
(I)

wherein $R_{11}$ denotes an arylene group, such as phenylene, naphthylene or biphenylene which may have a substituent, e.g., an alkyl group, such as methyl, ethyl or propyl; an alkoxy group, such as methoxy, ethoxy or propoxy; or a halogen atom, such as fluorine, chlorine or bromine;

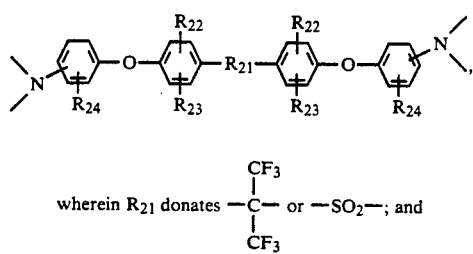
(II)

wherein $R_{21}$ donates $-\underset{CF_3}{\overset{CF_3}{\underset{|}{\overset{|}{C}}}}-$ or $-SO_2-$; and $R_{22}$, $R_{23}$ and $R_{24}$ respectively denote $-CF_3$, $-CH_3$ or $-H$ with proviso that at least one of $R_{21}$-$R_{24}$ is a fluorine-containing substituent.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 4A is a schematic sectional view showing an alignment state of a chiral smectic liquid crystal aligned according to the present invention;

FIG. 4B is an illustration of C-director alignments in a uniform alignment state; and FIG. 4C is an illustration of C-director alignments in a splay alignment state.

FIGS. 5A and 5B are plan views illustrating tilt angles $\theta$ in a uniform alignment state and a splay alignment state, respectively.

FIG. 6 is a sectional view showing a charge distribution, a direction of a spontaneous polarization $P_S$ and a direction of a reverse electric field Vrev.

FIG. 7 is a schematic plan view illustrating changes in tilt angle $\theta$ during and after application of an electric field.

DETAILED DESCRIPTION OF THE INVENTION

Figure 1A:
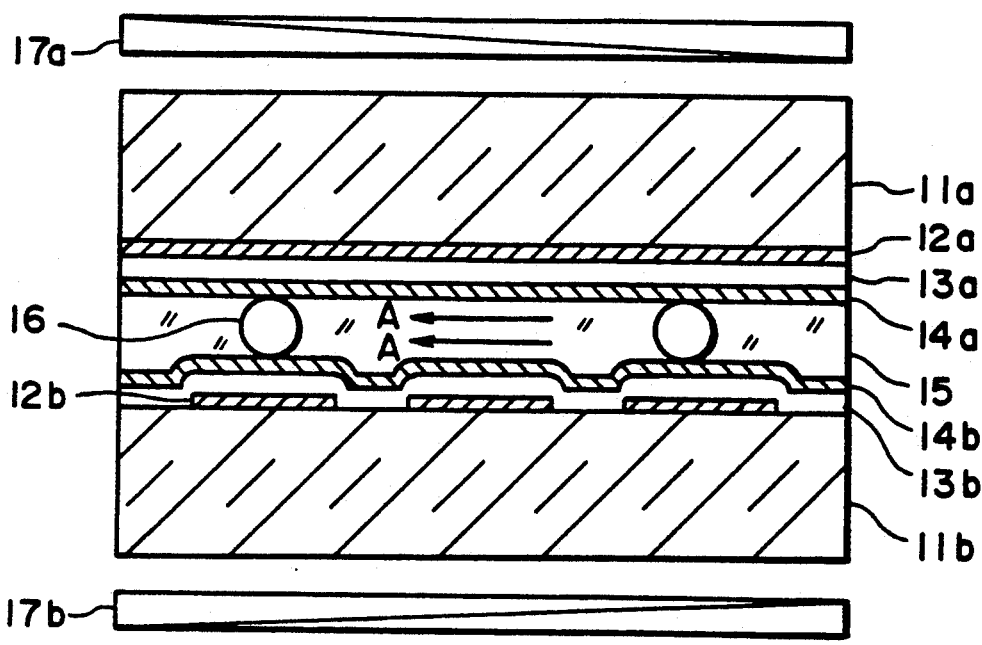
FIG. 1A is a schematic sectional view of an embodiment of the liquid crystal device according to the present invention and FIG. 1B is a schematic plan view illustrating rubbing axes provided to a pair of substrates.

FIG. 1A is a schematic sectional view of an embodiment of the liquid crystal device according to the present invention.

The liquid crystal device comprises a pair of substrates (glass plates) 11a and 11b which are coated with transparent electrodes 12a and 12b of $In_2O_3$, ITO (indium tin oxide), etc., 200-1000 Å-thick insulating films 13a of $SiO_2$, $TiO_2$, $Ta_2O_5$, etc., and 50-1000 Å-thick alignment control films 14a and 14b of above-mentioned fluorine-containing polyimide.

In this instance, the alignment control films 14a and 14b have been treated by rubbing in directions which are parallel to each other and in the same direction (indicated by arrows A in FIG. 1A). A chiral smectic liquid crystal 15 is disposed between the substrates 11a and 11b, and the spacing between the substrates 11a and 11b is set to provide the liquid crystal layer 15 with a thickness (e.g., 0.1-3 microns) which is sufficiently small to suppress the formation of a helical structure of the chiral smectic liquid crystal 15 by disposing spacer beads 16 of, e.g., silica, alumina, etc. between the substrates 11a and 11b, whereby the chiral smectic liquid crystal 15 assumes a bistable alignment state.

According to our experiments, by using an alignment method using a specific polyimide alignment film treated by rubbing as explained with reference to Examples described hereinafter, there has been realized an alignment state which provides a large optical contrast between a bright and a dark state, particularly with respect to non-selected pixels during multiplexing drive as disclosed in U.S. Pat. No. 4,655,561, etc., and also is free from a delay in optical response leading to a problem of after-image in a display at the time of switching during such multiplexing drive.

The fluorine-containing polyimide film used in the present invention may be obtained by synthesizing a polyamide acid through condensation reaction between a carboxylic acid anhydride and a fluorine-containing diamine and subjecting the polyamide acid to cryclization under heating.

Examples of the fluorine-containing diamine suitably used in the present invention may include the following: p-bis(4-amino-2-trifluoromethylphenoxy)benzene

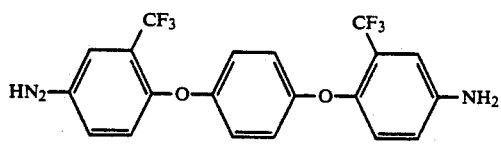

4,4'-bis (4-amino-2-trifluoromethylphenoxy)biphenyl

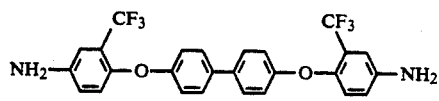

4,4'-bis(4-amino-2-trifluoromethylphenoxy)biphenyl

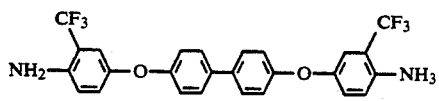

2,7-bis(4-amino-3-trifluoromethylphenoxy)naphthalene

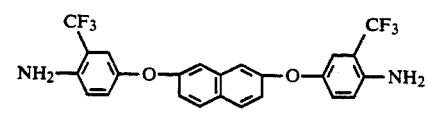

1,5-bis(4-amino-3-trifluoromethylphenoxy)naphthalene

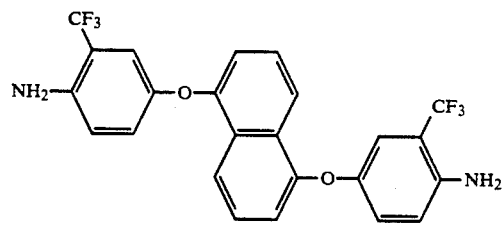

2,2-bis[4-(4-aminophenoxy)phenyl]hexafluoropropane

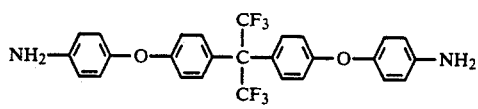

2,2-bis[4-(3-aminophenoxy)phenyl]hexafluoropropane

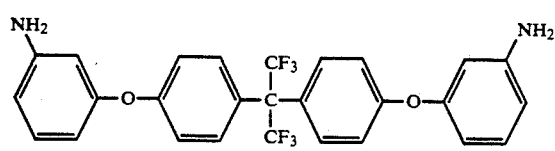

2,2-bis[4-(2-aminophenoxy)phenyl]hexafluoropropane

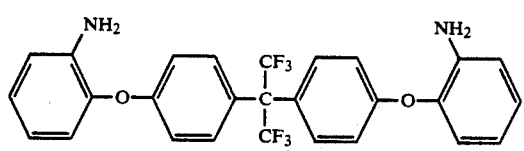

2,2-bis[4-(2-aminophenoxy)-3,5-dimethylphenyl]hexafluoropropane

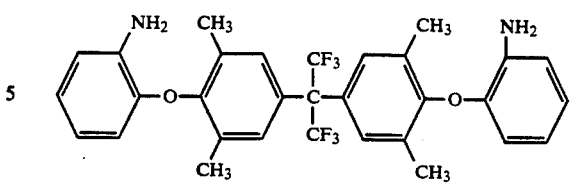

4,4'-bis(4-amino-2-trifluoromethylphenoxy)diphenyl sulfone

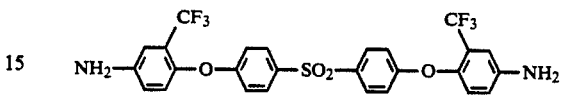

4,4'-bis(3-amino-5-trifluoromethylphenoxy)diphenyl sulfone

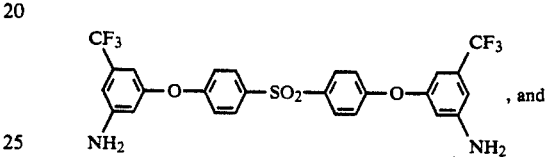

, and 2,2-bis[4-(4-amino-2-trifluoromethylphenoxy)phenyl]-hexafluoropropane

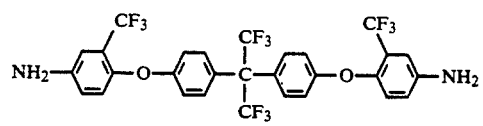

Examples of the tetracarboxylic acid anhydride may include: pyromellitic anhydride, 2,3,6,7-naphthalenetetracarboxylic anhydride, 3,3',4,4'-diphenyltetracarboxylic anhydride, 1,2,5,6-naphthalenetracarboxylic anhydride, 2,2',3,3'-diphenyltetracarboxylic anhydride, thiophene-2,3,4,5-tetracarboxylic anhydride, 2,2-bis(3,4-biscarboxyphenyl)propane anhydride, 3,4-dicarboxyphenyl sulfone anhydride, perylene-3,4,9,10-tetracarboxylic anhydride, bis(3,4-dicarboxyphenyl) ether anhydride, and 3,3',4,4'-benzophenonetetracarboxylic anhydride. In addition to the above, anhydrides of the following fluorine-containing tetracarboxylic acids may also be suitably or even preferably be used; 2,2-bis[4-(3,4-dicarboxyphenoxy)phenyl]hexafluoropropane, 2,2-bis(3-4-dicarboxyphenyl)hexafluoropropane, bis(3,4-dicarboxyphenyl)hexafluoropropane, 4,4'-bis[4-(3,4-dicarboxyphenoxy)phenyl]hexafluoropropane, (trifluoromethyl)pyromellitic acid, bis(trifluoromethyl)-pyromellitic acid, 5,5'-bis(trifluoromethyl)-3,3',4,4'-tetracarboxybiphenyl, 2,2',5,5'-tetrakis(trifluoromethyl)-3,3',4,4'-tetracarboxybiphenyl, 5,5'-bis(trifluoromethyl)-3,3',4,4'-tetracarboxydiphenyl ether, 5,5'-bis(trifluoromethyl)-3,3',4,4'-tetracarboxybenzo-phenone, bis[(trifluoromethyl)dicarboxyphenoxy]benzene, bis[(trifluoromethyl)dicarboxyphenoxy]biphenyl, bis[(trifluoromethyl)dicarboxyphenoxy](trifluoromethyl)-benzene, bis[(trifluoromethyl)dicarboxyphenoxy]bis-(trifluoromethyl)biphenyl, bis[(trifluoromethyl)-dicarboxyphenoxy]diphenyl ether, bis(dicarboxyphenoxy)-(trifluoromethyl)benzene, bis(dicarboxyphenoxy)bis-(trifluoromethyl)benzene, bis(dicarboxyphenoxy)-tetrakis(trifluoromethyl)benzene, bis(dicarboxyphenoxy)-bis(trifluoromethyl)biphenyl, bis(dicarboxyphenoxy)- tetrakis(trifluoromethyl)biphenyl, 2,2-bis[4-(2,3-dicarboxybenzoyloxy)phenyl]hexafluoropropane, 2,2-bis[4-(3,4-dicarboxybenzoyloxy)-3-bromophenyl]-hexafluoropropane, 2,2-bis[4-(3,4-dicarboxybenzoyloxy)-3,5-dimethylphenyl]hexafluoropropane, 2,2-bis[4-(3,4-dicarboxybenzoyloxy)phenyl]octafluorobutane, 2,2-bis[(4-(2-trifluoromethyl-3,4-dicarboxybenzoyloxy)-phenyl]hexafluoropropane, 1,3-bis[4-(3,4-dicarboxybenzoyloxy)phenyl]hexafluoropropane, 1,5-bis[4-(3,4-dicarboxybenzoyloxy)phenyl]decafluoropentane, 1,6-bis[4-(3,4-dicarboxybenzoyloxy)phenyl]dodecafluorohexane, 1,7-bis[4-(3,4-dicarboxybenzoyloxy)phenyl]-tetradecafluoroheptane, 1,5-bis[4-(3,4-dicarboxybenzoyloxy)-3,5-dibromophenyl]decafluoropentane, 1,5-bis[4-(3,4-dicarboxybenzoyloxy)-3,5-bistrifluoromethylphenyl]decafluoropentane, 1,5-bis[4-(2-trifluoromethyl-3,5-dicarboxybenzoyloxy)phenyl]decafluoropentane, 2,2-bis[4-(3,4-dicarboxyphenoxy)phenyl]-hexafluoropropane, 2,2-bis[4-(2,3-dicarboxyphenoxy)-phenyl]hexafluoropropane, 2,2-bis[4-(3,4-dicarboxyphenoxy)-3-bromophenyl]hexafluoropropane, 2,2-bis(4-(3,4-dicarboxyphenoxy)-3,5-dibromophenyl]-hexafluoropropane, 2,2-bis[4-(3,4-dicarboxyphenoxy)-3,5-dimethylphenyl]hexafluoropropane, 2,2-bis[4-(3,4-dicarboxyphenoxy)phenyl]octafluorobutene, 2,2-bis[4-(3,4-dicarboxy-2-trifluoromethylphenoxy)-phenyl]-hexafluoropropane, 1,3-bis[4-(3,4-dicarboxyphenoxy)-phenyl]hexafluoropropane, 1,5-bis[4-(3,4-dicarboxyphenoxy)phenyl]decafluoropentane, 1,6-bis[4-(3,4-dicarboxyphenoxy)phenyl]dodecafluorohexane, 1,7-bis-[4-(3,4-dicarboxyphenoxy)phenyl]tetradecafluoro-pentane, 1,5-bis[4-(3,4-dicarboxyphenoxy)-3,5-dibromophenyl]decafluoropentane, 1,5-bis[4-(3,4-dicarboxyphenoxy)-3,5-bistrifluoromethylphenyl]-decafluoropentane, and 1,5-bis[4-(3,4-dicarboxy-2-trifluoromethylphenoxy)phenyl]decafluoropentane.

According to another preferred embodiment of the present invention, the alignment films 14a and 14b may comprise a polyimide which has at least one structural unit represented by the following formula (III)–(VI) and in combination with a structural unit represented by the following formula (VII):

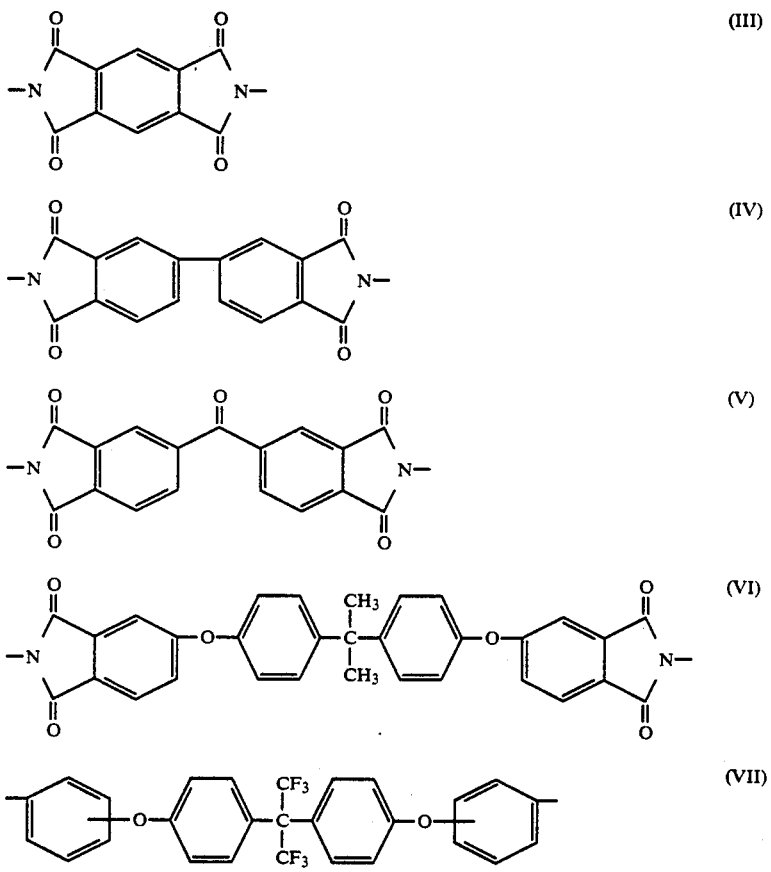

The above polyimide may be obtained by synthesizing a polyamide acid through condensation of a carboxylic anhydride and a diamine and cyclizing the polyamide under heating. More specifically, a polyamide acid may be prepared by reacting at least one of the following tetracarboxylic anhydrides (1)–(4):

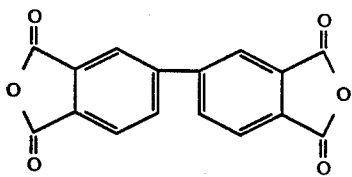

(2)

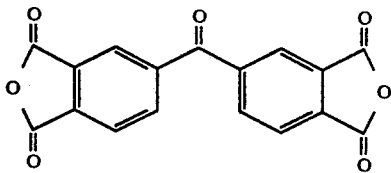

(3)

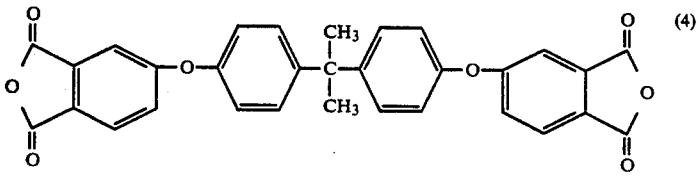

(4)

with the following fluorine-containing diamine (5):

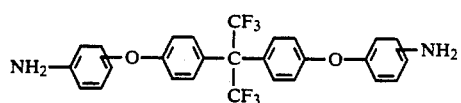

(5)

Then, the polyamide acid may after dilution with an appropriate solvent as desired, be applied onto a substrate and then cured under heating to provide a polyimide film.

The tetracarboxylic anhydride represented by any one of the formulas (1)-(4) may be used in a proportion of 0.01-100 wt. parts, preferably 0.1-10 wt. parts, per 1 wt. part of the diamine (5). The compounds represented by the formulas (1)-(4) may be used singly or in combination of two or more species. It is particularly suitable to use the carboxylic anhydride of the formula (4) for preparing the polyimide films. When two or more of the compounds (1)-(4) are used in combination, it is preferred that they are used in substantially the same amounts.

In order to form a film of the polyimide on a substrate, a solution of a polyamide acid as a precursor of the polyimide in a solvent, such as dimethylformamide, dimethylacetoamide, dimethylsulfoxide or N-methylpyrrolidone at a concentration of 0.01-40 wt. % may be applied onto the substrate by spinner coating, spray coating, roller coating, etc., and heated at 100°-350° C., preferably 200°-300° C., to cause dehydro-cyclization. The thus-formed polyimide film may be rubbed with a cloth, etc. The polyimide film may be formed in a thickness of, e.g., 30 Å-1 micron, preferably 200-2000 Å, so as to also function as an insulating film. In this case, the insulating films 13a and 13b can be omitted. Further, in case of forming the polyimide film on the insulating film 13a or 13b, the polyimide film thickness may be set to 200 Å or less, preferably 100 Å or less.

The liquid crystal material used in the present invention may preferably be one showing a phase transition from isotropic phase through cholesteric phase and smectic A phase into chiral smectic C phase in the course of temperature decrease. Particularly, a chiral smectic liquid crystal showing a helical pitch of 0.8 microns or longer in cholesteric phase (measured at a mid temperature in the cholesteric range). Preferred examples of such a liquid crystal material may include liquid crystal materials (1)-(5) below comprising the following liquid crystals "LC-1", "80B" and "80SI*" in the indicated proportions by weight.

LC-1

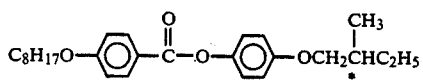

80B

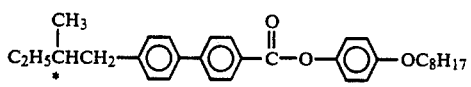

80SI*

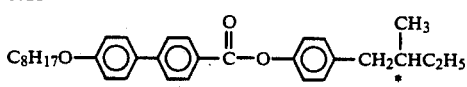

Figure 1B:
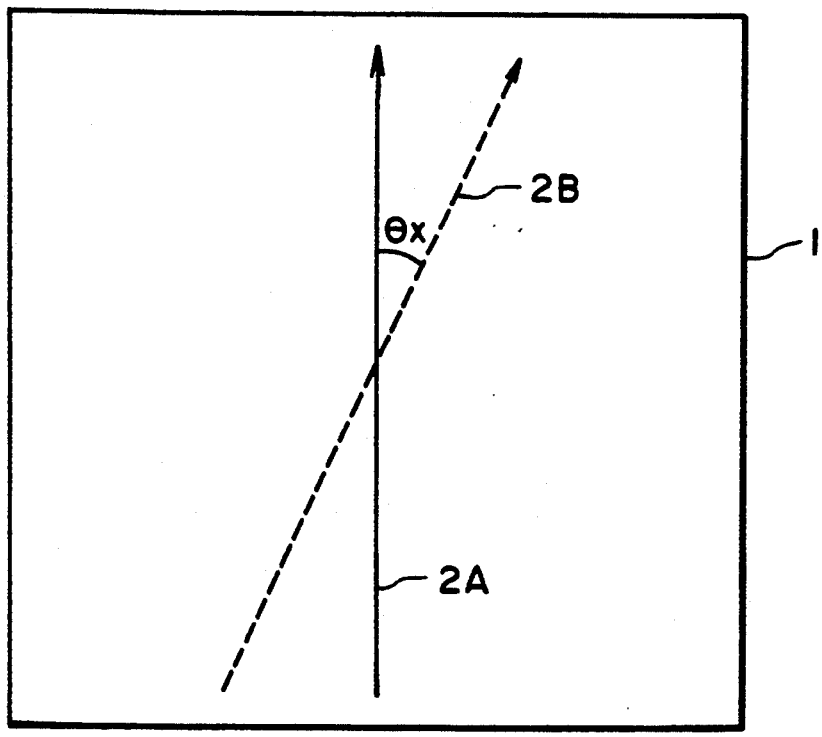

Liquid crystal material
(1) (LC-1)$_{90}$/(80B)$_{10}$
(2) (LC-1)$_{80}$/(80B)$_{20}$
(3) (LC-1)$_{70}$/(80B)$_{30}$
(4) (LC-1)$_{60}$/(80B)$_{40}$
(5) (80SI*)$_{100}$ FIG. 1B is a schematic plan view for illustrating another preferred embodiment of the liquid crystal device according to the present invention. The device comprises a pair of substrates including one substrate closer to a viewing position having a rubbing axis provided in the direction of an arrow 2A and the other substrate farther from the viewing position having a rubbing axis in the direction of an arrow 2B which intersects with the rubbing axis 2A at an intersection angle in the range of 2-15 degrees, preferably 3-12 degrees. In a particularly preferred embodiment, the rubbing axis 2A is disposed to form an intersection angle $\theta x$ in the counter-clockwise direction with respect to the rubbing axis 2B.

Figure 2:
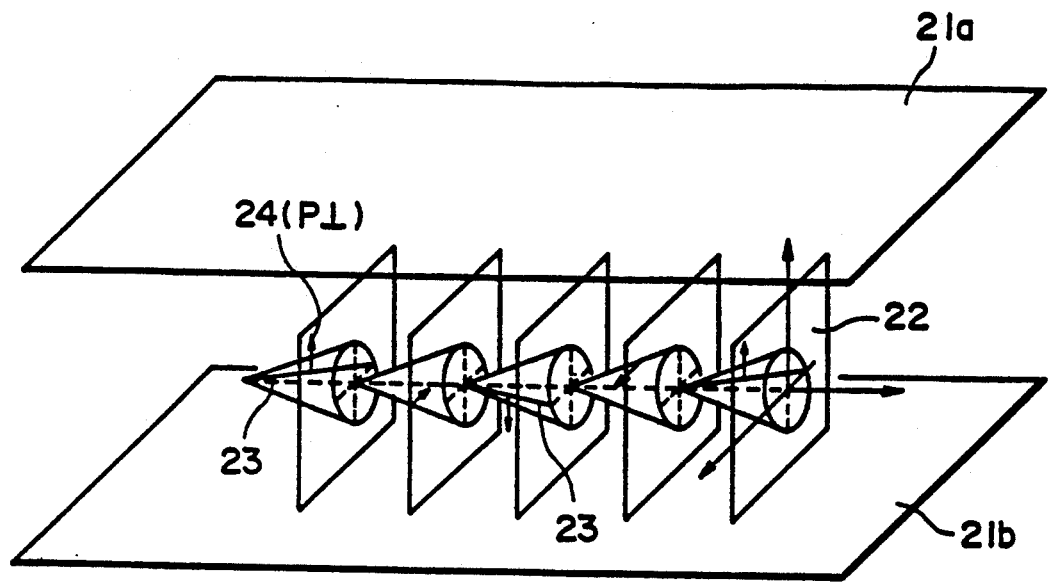
FIG. 2 is a perspective view showing schematically an alignment of a chiral smectic liquid crystal having a helical structure.

FIG. 2 is a schematic illustration of a ferroelectric liquid crystal cell (device) for explaining operation thereof. Reference numerals 21a and 21b denote substrates (glass plates) on which a transparent electrode of, e.g., $In_2O_3$, $SnO_2$, ITO (indium-tin-oxide), etc., is disposed, respectively. A liquid crystal of an SmC*-phase (chiral smectic C phase) or SmH*-phase (chiral smectic H phase) in which liquid crystal molecular layers 22 are aligned perpendicular to surfaces of the glass plates is hermetically disposed therebetween. Full lines 23 show liquid crystal molecules. Each liquid crystal molecule 23 has a dipole moment (P⊥) 24 in a direction perpendicular to the axis thereof. The liquid crystal molecules 23 continuously form a helical structure in the direction of extension of the substrates. When a voltage higher than a certain threshold level is applied between electrodes formed on the substrates 21a and 21b, a helical structure of the liquid crystal molecule 23 is unwound or released to change the alignment direction of respective liquid crystal molecules 23 so that the dipole moment (P⊥) 24 are all directed in the direction of the electric field. The liquid crystal molecules 23 have an elongated shape and show refractive anisotropy between the long axis and the short axis thereof. Accordingly, it is easily understood that when, for instance, polarizers arranged in a cross nicol relationship, i.e., with their polarizing directions crossing each other, are disposed on the upper and the lower surfaces of the glass plates, the liquid crystal cell thus arranged functions as a liquid crystal optical modulation device of which optical characteristics vary depending upon the polarity of an applied voltage.

Figure 3:
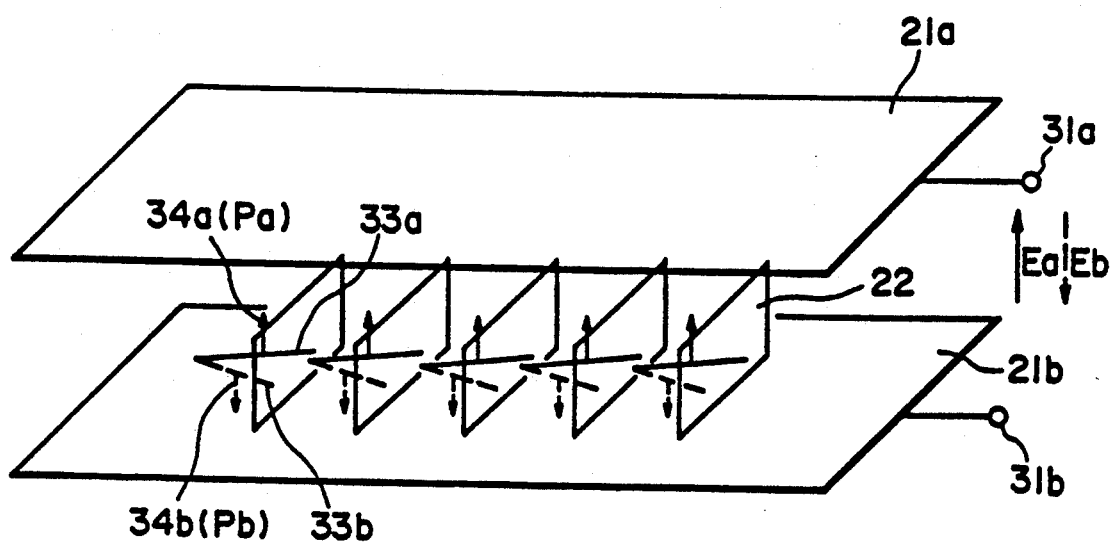
FIG. 3 is a perspective view showing schematically an alignment state of a chiral smectic liquid crystal having a non-helical structure.
Figure 8:
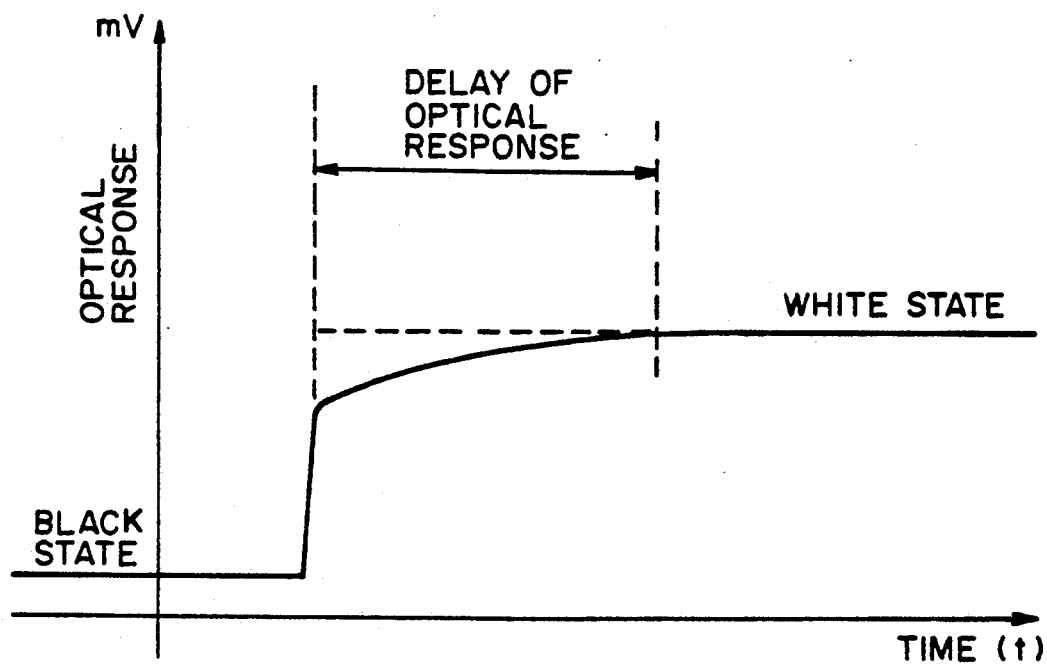
FIGS. 8 and 9 are graphs showing optical response characteristics according to a conventional device and the present invention, respectively.

Further, when the liquid crystal cell is made sufficiently thin (e.g., 0.1–3 microns), the helical structure of the liquid crystal molecules is unwound to provide a non-helical structure even in the absence of an electric field, whereby the dipole moment assumes either of the two states, i.e., Pa in an upper direction 34a or Pb in a lower direction 34b as shown in FIG. 3, thus providing a bistable condition. When an electric field Ea or Eb higher than a certain threshold level and different from each other in polarity as shown in FIG. 3 is applied to a cell having the above-mentioned characteristics, the dipole moment is directed either in the upper direction 34a or in the lower direction 34b depending on the vector of the electric field Ea or Eb. In correspondence with this, the liquid crystal molecules are oriented in either of a first stable state 33a and a second stable state 33b.

A first advantage attained by using such a ferroelectric liquid crystal cell is that the response speed is quite fast, and a second advantage is that the orientation of the liquid crystal shows bistability. The second advantage will be further explained, e.g., with reference to FIG. 3. When the electric field Ea is applied to the liquid crystal molecules, they are oriented in the first stable state 33a. This state is stably retained even if the electric field is removed. On the other hand, when the electric field Eb of which direction is opposite to that of the electric field Ea is applied thereto, the liquid crystal molecules are oriented to the second stable state 33b, whereby the directions of molecules are changed. This state is similarly stably retained even if the electric field is removed. Further, as long as the magnitude of the electric field Ea or Eb being applied is not above a certain threshold value, the liquid crystal molecules are placed in the respective orientation states.

FIG. 4A is a schematic sectional view showing an alignment state of liquid crystal molecules attained by the present invention, and FIG. 4B is a view showing alignment of corresponding C-directors.

Reference numerals 61a and 61b in FIG. 4A denote upper and lower substrates, respectively. Numeral 60 denotes a molecular layer composed of liquid crystal molecules 62, and liquid crystal molecules 62 are aligned so as to change their positions along the bottom face 64 (circular) of a cone 64. FIG. 4B more specifically shows a change in C-directors. Referring to FIG. 4B, at $U_1$ are shown C-directors 81 (each being a projection of a molecular long axis onto an imaginary plane perpendicular to the normal to a molecular layer 60) in one stable orientation state, and at $U_2$ are shown C-directors 81 in the other stable orientation state.

On the other hand, an alignment state attained by a conventional rubbing-treated polyimide film may be represented by a C-director diagram of FIG. 4C, which shows an alignment state wherein molecular axes are twisted in a large degree from the upper substrate 61a to the lower substrate 61b to provide a smaller tilt angle $\theta$.

FIG. 5A is a schematic plan view illustrating a tilt angle $\theta$ in an alignment state where C-directors 81 assume a state shown in FIG. 4B (referred to as "uniform alignment state"), and FIG. 5B is a schematic plan view illustrating a tilt angle $\theta$ in an alignment state where C-directors 81 assume a state shown in FIG. 4C (referred to as "splay alignment state"). In these figures, reference numeral 50 denotes a rubbing axis provided to the above-mentioned fluorine-containing polyimide film, numeral 51a denotes an average molecular axis in the orientation state $U_1$, numeral 51b denotes an average molecular axis in the orientation state $U_2$, numeral 52a denotes an average molecular axis in the orientation state $S_1$, and numeral 52b denotes an average molecular axis in the orientation state $S_2$. The average molecular axes 51a and 51b can be switched to each other by applying voltages of mutually opposite polarities. Similar switching is caused between the average molecular axes 52a and 52b.

Next, the effectiveness of the uniform alignment state with respect to a delay in optical response (after-image) due to a reverse electric field Vrev is explained.

If the capacitance of an insulating layer constituting a liquid crystal cell is denoted by Ci, the capacitance of a liquid crystal layer is denoted by $C_{LC}$ and the spontaneous polarization of the liquid crystal is denoted by $P_S$, Vrev causing after-image is expressed by the following equation.

$$Vrev = 2P_S/(Ci + C_{LC})$$

FIG. 6 is a schematic sectional view illustrating changes in charge distribution direction of $P_S$ and direction of the reverse electric field in a liquid crystal cell. At FIG. 6(a), there is shown a distribution of ⊕ and ⊖ charges in a memory state before application of a pulse electric field, where the spontaneous polarization is directed from ⊕ charges to ⊖ charges. At FIG. 6(b) is shown a state immediately after removal of a pulse electric field, when the direction of the spontaneous polarization $P_S$ is opposite to that shown at FIG. 6(a) (thus, the liquid crystal molecules are inverted from one stable orientation state to the other orientation state) but the distribution of the ⊕ and ⊖ charges is similar to that shown at FIG. 6(a), so that a reverse electric field Vrev is generated as indicated by an arrow shown at FIG. 6(b). The reverse electric field Vrev disappears in a short time to provide a distribution of ⊕ and ⊖ charges as shown at FIG. 6(c).

FIG. 7 is a plan view showing a change in optical response in a splay alignment state given by a conventional polyimide alignment film in terms of a change in tilt angle $\theta$. Referring to FIG. 7, at the time of application of a pulse electric field, the orientation of liquid crystal molecules is changed from an average molecular axis S(A) in a splay alignment state to be overshot to an average molecular axis $U_2$ in a uniform alignment state close to that providing a maximum tilt angle $\widehat{H}$ along a path denoted by an arrow $X_1$, and immediately after the removal of the pulse electric field, the orientation is changed along a path denoted by an arrow $X_2$ to an average molecular axis S(B) in a splay alignment state providing a decreased tilt angle $\theta$ due to the action of the reverse electric field Vrev shown at FIG. 6(b). Then, as the reverse electric field Vrev attenuates as shown at FIG. 6(c), the orientation is changed along a path denoted by an arrow $X_3$ to an average molecular axis S(C) in a splay alignment state providing a stable orientation state having a somewhat increased tilt angle $\theta$.

Figure 9:
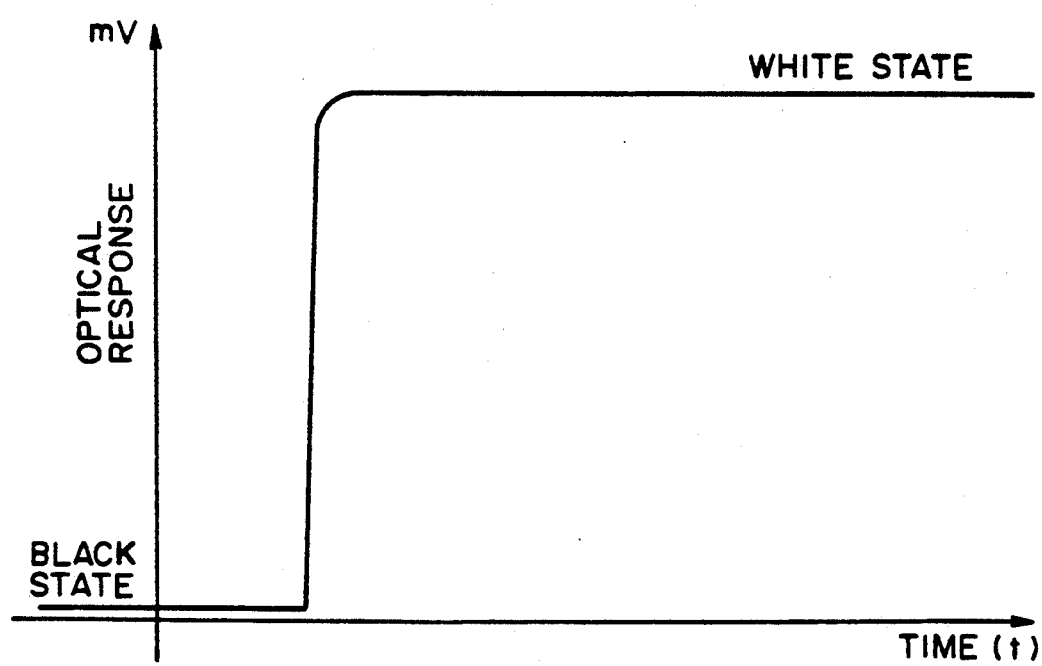

In the alignment state given by using the above-mentioned fluorine-containing polyimide film of the present invention, the average molecular axes S(A), S(B) and S(C) in the splay alignment state shown in FIG. 7 are not caused but it is possible to form an alignment state with an average molecular axis giving a tilt angle $\theta$ which is close to a maximum tilt angle $\widehat{H}$. An optical response at this time according to the present invention is shown in FIG. 9. FIG. 9 shows that a delay in optical response causing after-image is obviated and a high contrast in memory states is caused.

Hereinbelow, the present invention will be explained based on Examples.

EXAMPLE 1

Two 1.1 mm-thick glass plates each provided with a 1000 Å-thick ITO film were respectively coated with a 3.0 wt. % solution of a polyamide acid represented by the formula shown blow in a mixture solvent of N-methylpyrrolidone/n-butylcellosolve=5/1 by means of a spinner rotating at 3000 rpm for 30 min.

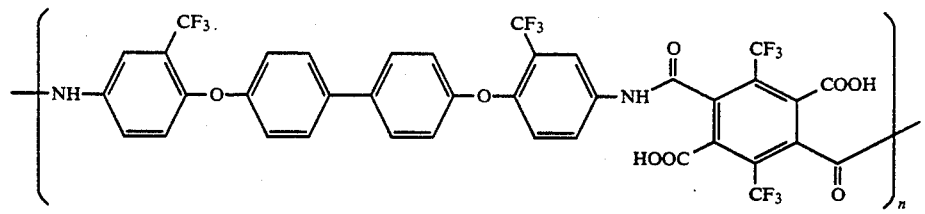

(n (degree of polymerization)=700-2000)
After the coating, the film was subjected to curing under heating at 250° C. for about an hour to form a 450 Å-thick film. The coating film was then rubbed in one direction with a nylon-planted cloth.

On one of the two glass plates thus treated, 1.5 microns alumina beads were dispersed, and the other glass plate was superposed thereon so that their rubbing axes were parallel to each other and disposed in the same direction to form a blank cell.

The blank cell was filled with a ferroelectric smectic liquid crystal ("CS-1014" (trade name), available from Chisso K. K.) under vacuum and, after sealing, was gradually cooled from isotropic phase at a rate of 5° C./hour to 30° C., whereby an alignment was effected.

The "CS-1014" liquid crystal in the cell showed the following phase transition series.

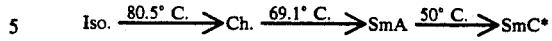

Iso.: isotropic phase,
Ch.: cholesteric phase,
SmA: smectic A phase,
SmC*: chiral smectic C phase.

The experiment thereafter was performed at 25° C.

The above-prepared liquid crystal cell was sandwiched between a pair of 90 degrees-cross nicol polarizers to provide a liquid crystal device and was supplied with a pulse of 50 usec and 30 V. Then, the cross nicol polarizers were set at the extinction position (providing the darkest state), and the transmittance through the liquid crystal device at this time was measured by a photo-multiplier. Then, a pulse of 50 $\mu$sec and $-30$ V was applied to the device, and the transmittance (brightest state) at this time was measured in the same manner, whereby the following data were obtained.

Tilt angle $\theta=15$ degrees, transmittance in the brightest state=42%, transmittance in the darkest state=1%, contrast ratio=42:1.

The delay in optical response causing after-image was 0.2 sec or less.

Figure 10:
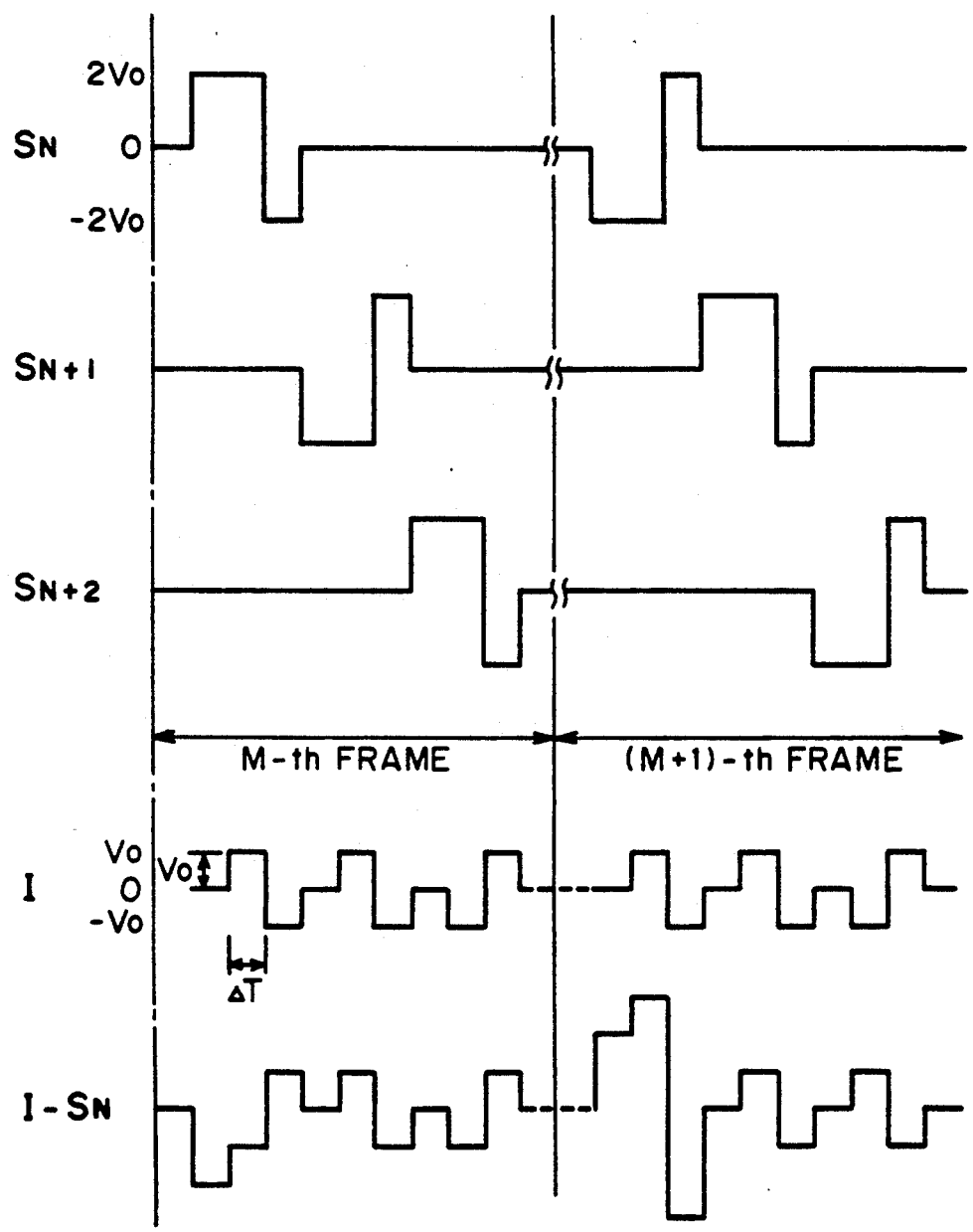
FIG. 10 is a waveform diagram illustrating driving waveforms used in an embodiment of the present invention.

The liquid crystal device was subjected to multiplexing drive for display using driving waveforms shown in FIG. 10, whereby a high-quality display with a high contrast was attained. Further, after an image display of a prescribed character image, the whole picture area was erased into "white", whereby no after-image was recognized. Referring to FIG. 10, at $S_N$, $S_{N+1}$ and $S_{N+2}$ are shown voltage waveforms applied to scanning lines, at I is shown a voltage waveform applied to a representative date line, and at (I-$S_N$) is shown a combined voltage waveform applied to the data line I and the scanning line $S_N$. In the above embodiment, the drive was performed under the conditions of $V_0=5$-8 volts and T=20-70 $\mu$sec.

EXAMPLES 2-20

Liquid crystal cells were prepared in the same manner as in Example 1 except that the alignment control films (in terms of precursor polyamide acids represented by the formulas) and liquid crystal materials shown in Table 1 below were used.

The respective cells were tested in the same manner as in Example 1, whereby measured data of contrast ratio and delay time in optical response shown in Table 2 appearing hereinafter were obtained.

The respective cells were subjected to the multiplexing drive for display in the same manner as in Example 1, whereby similar results were attained with respect to contrast and after-image.

TABLE 1

| Example | Alignment film (precursor polyamide acid) | Liquid crystal material |
|---------|-------------------------------------------|-------------------------|
| 2 | 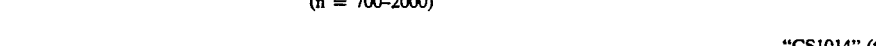 (n = 700–2000) | "CS1014" (trade name) (FLC, Chisso K.K.) |
| 3 | 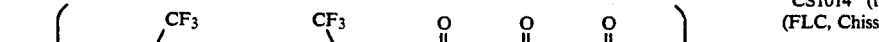 (n = 700–2000) | "CS1014" (trade name) (FLC, Chisso K.K.) |
| 4 | 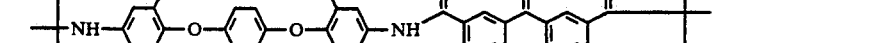 (n = 700–2000) | "CS1014" (trade name) (FLC, Chisso K.K.) |
| 5 | " | Liquid crystal material (3) described hereinbefore |
| 6 | 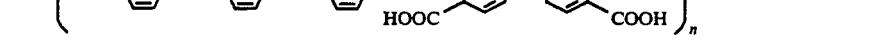 (n = 700–2000) | Liquid crystal material (3) described hereinbefore |
| 7 | 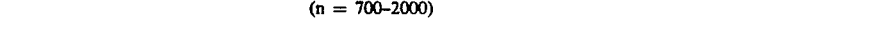 (n = 700–2000) | "CS-1014" (trade name) (FLC, Chisso K.K.) |
| 8 |  (n = 700–2000) | "CS-1014" (trade name) (FLC, Chisso K.K.) |
| 9 | 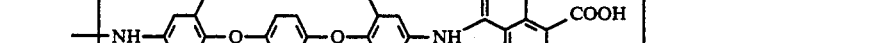 (n = 700–2000) | "CS-1014" (trade name) (FLC, Chisso K.K.) |
| 10 | 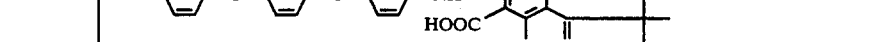 (n = 700–2000) | "CS-1014" (trade name) (FLC, Chisso K.K.) |
| 11 | " | Liquid crystal material (3) |

TABLE 1-continued
| Example | Alignment film (precursor polyamide acid) | Liquid crystal material |
|---|---|---|
| 12 | 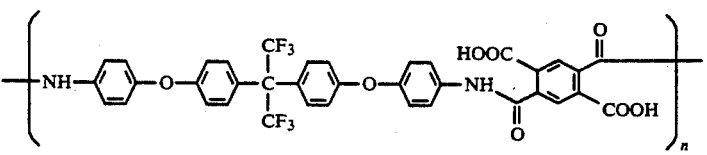 (n = 700-2000) | " |
| 13 | 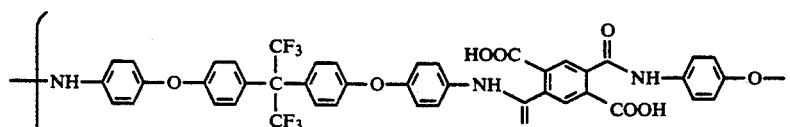 (n = 700-2000) | Liquid crystal material (3) |
| 14 | 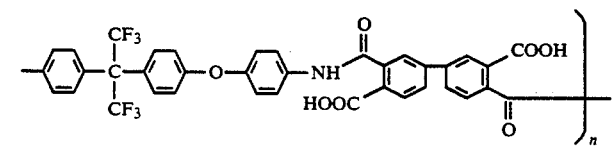 (n = 700-2000) | "CS-1014" (trade name) (FLC, Chisso K.K.) |
| 15 | 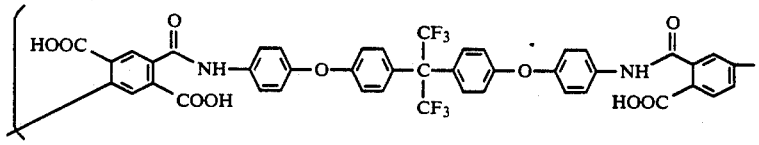 (n = 700-2000) | "CS-1014" (trade name) (FLC, Chisso K.K.) |
| 16 | 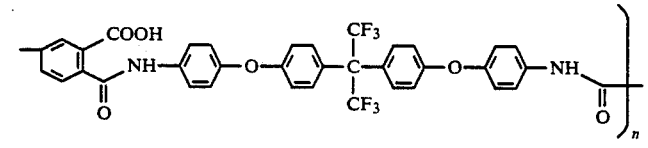 (n = 700-2000) | "CS-1014" (trade name) (FLC, Chisso K.K.) |
| 17 | 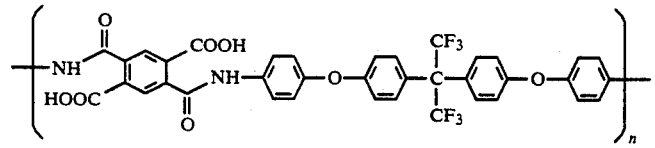 (n = 700-2000) | "CS-1014" (trade name) (FLC, Chisso K.K.) |
| 18 | " | Liquid crystal material (3) |

TABLE 1-continued

| Example | Alignment film (precursor polyamide acid) | Liquid crystal material |
|---|---|---|
| 19 | 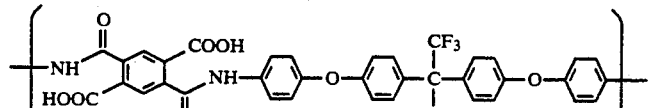 (n = 700–2000) | Liquid crystal material (3) |
| 20 | 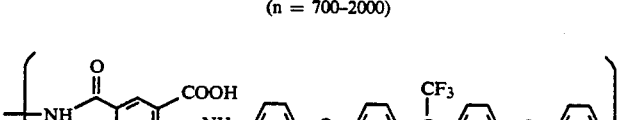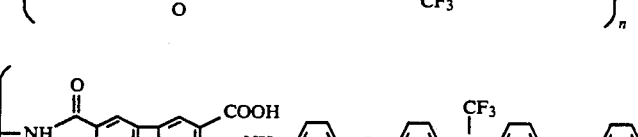 (n = 700–2000) | " |

TABLE 2

| Example | Contrast ratio | Delay in optical response (sec) |
|---|---|---|
| 2 | 45:1 | 0.3 |
| 3 | 42:1 | 0.1 |
| 4 | 51:1 | 0.2 |
| 5 | 39:1 | 0.3 |
| 6 | 31:1 | 0.1 |
| 7 | 49:1 | 0.2 |
| 8 | 42:1 | 0.2 |
| 9 | 39:1 | 0.1 |
| 10 | 50:1 | 0.1 |
| 11 | 40:1 | 0.1 |
| 12 | 42:1 | 0.2 |
| 13 | 52:1 | 0.1 |
| 14 | 40:1 | 0.2 |
| 15 | 31:1 | 0.2 |
| 16 | 42:1 | 0.3 |
| 17 | 29:1 | 0.2 |
| 18 | 35:1 | 0.1 |
| 19 | 23:1 | 0.1 |
| 20 | 24:1 | 0.1 |

COMPARATIVE EXAMPLES 1–4

Liquid crystal cells were prepared in the same manner as in Example 1 except that the alignment control films (in terms of commercially available precursor polyamide acid varnish, the degree of polmerization being each in the range of 700-2000) and liquid crystal materials shown in Table 3 below were used. The measured data of contrast ratio and delay in optical response measured for each of the cells are shown in Table 4 below.

The respective cells were subjected to the multiplexing drive for display in the same manner as in Example 1, whereby the resultant contrasts were smaller than that given by Example 1 and after-image was recognized for each cell.

TABLE 3

| Comparative Example | Alignment film (polyamide acid varnish) | Liquid crystal material |
|---|---|---|
| 1 | "SP-710" (trade name) (aromatic polyimide varnish, Toray K.K.) | "CS-1014" (trade name) (FLC, Chisso K.K.) |
| 2 | "SP-710" (trade name) (aromatic polyimide varnish, Toray K.K.) | Liquid crystal material (3) described herinbefore |
| 3 | "LQ-5200" (trade name) (polyimide varnish, Hitachi Kasei K.K.) | "CS-1014" |
| 4 | "LQ-5200" (trade name) (polyimide varnish, Hitachi Kasei K.K.) | Liquid crystal material (3) |

TABLE 4

| Comp. Example | Contrast ratio | Delay in optical response (sec) |
|---|---|---|
| 1 | 8:1 | 1.5 |
| 2 | 7:1 | 2.5 |
| 3 | 10:1 | 1.2 |
| 4 | 8:1 | 2.2 |

EXAMPLES 21–40

Liquid crystal cells were prepared in the same manner as in Example 1–48, respectively, except that a pair of substrates for each cell were disposed so that their rubbing axes intersected each other at a counter-clockwise intersection angle of −6 degrees as shown in FIG. 1B.

The respective cells prepared above were tested in the same manner as in Examples 1–20, respectively, whereby measured data shown in Table 5 below were obtained, showing remarkably improved contrast ratios compared with the corresponding cells of Examples 1–20.

TABLE 5

| Example | Polyimide | Contrast ratio | Delay in optical response (sec) |
|---|---|---|---|
| 21 | Same as Ex.1 | 43:1 | 0.2 |
| 22 | Same as Ex.2 | 46:1 | 0.2 |
| 23 | Same as Ex.3 | 45:1 | 0.1 |
| 24 | Same as Ex.4 | 56:1 | 0.2 |
| 25 | Same as Ex.5 | 47:1 | 0.2 |
| 26 | Same as Ex.6 | 48:1 | 0.1 |

TABLE 5-continued

| Example | Polyimide | Contrast ratio | Delay in optical response (sec) |
| --- | --- | --- | --- |
| 27 | Same as Ex.7 | 50:1 | 0.2 |
| 28 | Same as Ex.8 | 46:1 | 0.2 |
| 29 | Same as Ex.9 | 41:1 | 0.1 |
| 30 | Same as Ex.10 | 50:1 | 0.1 |
| 31 | Same as Ex.11 | 45:1 | 0.1 |
| 32 | Same as Ex.12 | 44:1 | 0.2 |
| 33 | Same as Ex.13 | 52:1 | 0.1 |
| 34 | Same as Ex.14 | 42:1 | 0.2 |
| 35 | Same as Ex.15 | 37:1 | 0.2 |
| 36 | Same as Ex.16 | 45:1 | 0.2 |
| 37 | Same as Ex.17 | 35:1 | 0.2 |
| 38 | Same as Ex.18 | 41:1 | 0.1 |
| 39 | Same as Ex.19 | 38:1 | 0.1 |
| 40 | Same as Ex.20 | 43:1 | 0.1 |

COMPARATIVE EXAMPLES 5-8

Liquid crystal cells were prepared in the same manner as in Example 21 except that the alignment control films (in terms of commercially available precursor polyamide acid varnish, the degree of polymerization being each in the range of 700-2000) and liquid crystal materials shown in Table 6 below were used. The measured data of contrast ratio and delay in optical response measured for each of the cells are shown in Table 7 below.

The respective cells were subjected to the multiplexing drive for display in the same manner as in Example 1, whereby the resultant contrasts were smaller than that given by Example 21 and after-image was recognized for each cell.

TABLE 6

| Comparative Example | Alignment film (polyamide acid varnish) | Liquid crystal material |
| --- | --- | --- |
| 5 | "SP-710" (trade name) (aromatic polyimide varnish, Toray K.K.) | "CS-1014" (trade name) (FLC, Chisso K.K.) |
| 6 | "SP-710" (trade name) (aromatic polyimide varnish, Toray K.K.) | Liquid crystal material (3) described herinbefore |
| 7 | "LQ-5200" (trade name) (polyimide varnish, Hitachi Kasei K.K.) | "CS-1014" |
| 8 | "LQ-5200" (trade name) (polyimide varnish, Hitachi Kasei K.K.) | Liquid crystal material (3) |

TABLE 7

| Comp. Example | Contrast ratio | Delay in optical response (sec) |
| --- | --- | --- |
| 5 | 9:1 | 1.5 |
| 6 | 7:1 | 2.5 |
| 7 | 11:1 | 1.2 |
| 8 | 7:1 | 2.2 |

As is apparent from the above Examples and Comparative Examples, according to the present invention, there is obtained a liquid crystal device which provides a high-quality display including a high contrast between the bright and dark states, particularly a very large display contrast at the time of multiplexing drive and is free from ugly after-image.

What is claimed is:

1. A method of alignment control of a chiral smectic liquid crystal, comprising:
providing two substrates,
forming a film of a polyimide having a fluorine-containing substituent in its diamine-originated moiety on at least one of the two substrates,
rubbing the polyimide film in one direction,
disposing the two substrates parallel to each other with the polyimide film disposed inside, and
disposing a chiral smectic liquid crystal between the two substrates so that molecules of the liquid crystal adjacent to the polyimide film are aligned with an inclination to the polyimide film.

2. A method according to claim 1, wherein said fluorine-containing substituent is a fluoroalkyl group.

3. A method according to claim 1, wherein said chiral smectic liquid crystal is placed in chiral smectic C phase by cooling through cholesteric phase and smectic A phase in sequence to the chiral smectic C phase.

* * * * *